US007849437B2

(12) United States Patent
Isaacs et al.

(10) Patent No.: US 7,849,437 B2
(45) Date of Patent: Dec. 7, 2010

(54) OBJECT ORIENTED WEB APPLICATION FRAMEWORK

(75) Inventors: Scott M. Isaacs, Sammamish, WA (US); Greg A. Marks, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1201 days.

(21) Appl. No.: 11/218,112

(22) Filed: Sep. 1, 2005

(65) Prior Publication Data
US 2007/0067418 A1 Mar. 22, 2007

(51) Int. Cl.
*G06F 9/44* (2006.01)
(52) U.S. Cl. .................. 717/100; 717/107; 717/115; 719/316
(58) Field of Classification Search .................. 717/100, 717/107, 115; 709/203, 218, 219; 707/10; 719/316
See application file for complete search history.

(56) References Cited

U.S. PATENT DOCUMENTS 6,026,433 A * 2/2000 D'Arlach et al. ............ 709/217

| | | | |
|---|---|---|---|
| 7,051,098 B2 * | 5/2006 | Masters et al. | 709/224 |
| 2001/0037490 A1 * | 11/2001 | Chiang | 717/2 |
| 2003/0221168 A1 * | 11/2003 | Kozlov | 715/513 |
| 2006/0101442 A1 * | 5/2006 | Baumgart et al. | 717/162 |

OTHER PUBLICATIONS

Chien-Hung Liu; Kung, D.C.; Pei Hsia; Object-based data flow testing of web applications; IEEE, 2000, pp. 7-16.*
Chung, S.; Yun-Sik Lee; Modeling Web applications using Java and XML related technologies; IEEE, 2003, pp. 1-10.*
Heqing Guan; Beihong Jin; Jun Wei; Wei Xu; Ningjiang Chen; A framework for application server based Web services management; IEEE, 2005, pp. 1-8.*

* cited by examiner

*Primary Examiner*—Wei Y Zhen
*Assistant Examiner*—Satish Rampuria
(74) *Attorney, Agent, or Firm*—Vierra Magen Marcus & DeNiro LLP

(57) ABSTRACT

A framework for implementing web-based applications using standard object-oriented programming techniques. The framework may be implemented by computer-executable components executable by a Web browser is provided. The components include a resource creation method for creating resource objects, a page interpreter creating instances of objects based on bindings defined in a web-page, and a lifecycle management component for managing instances of the objects.

18 Claims, 6 Drawing Sheets

OBJECT ORIENTED WEB APPLICATION FRAMEWORK

BACKGROUND

The user experience on the World Wide Web has evolved from viewing static pages of information to interaction with web-based applications. Most users experience the web through a Web Browser application such as Internet Explorer, Opera, Netscape or Firefox. Web browsers essentially provide a forms-based environment originally designed to display text and presentation information to the application developer. Techniques for manipulating browsers now include richer tools and HTML enhancements, including client side scripting environments, such as JavaScript, Cascading Style Sheets (CSS), and animation plug-ins such as Macromedia Flash.

Web based applications now provide users various types of functionality. When building Web applications, it is difficult to create maintainable, component-based cross-browser applications. Scripting allows developers to add increased interaction, information processing, and control in Web-based content.

Current technology fails to address well understood architectural approaches for defining and implementing associations between different behaviors on the page, and fails to enable reuse of behaviors in the web application design process. Generally, functions are enabled using downloadable java applications or JavaScript nested within the webpage. JavaScript is placed throughout the page in a manner which is not managed centrally. Most Web applications have scripts and behavior randomly placed throughout the page. For example, scripts may be in the head section, in-line, or attached directly to an element. There is no common approach to managing the dependencies between handlers and scripts. This can lead to performance or timing issues, such as when a user clicks a button and the script is not yet available. As a result, resource management to support scripts and web application becomes a problem.

Another issue for developers is managing the constraints of a client-side application. Web-applications are potentially downloaded via a constrained connection to a server. As applications become more interactive, the size of code and data increases, slowing the download process. There is typically a conflict between providing an enriched client interactivity in a web document while maintaining client performance. Therefore, developers seek to remove bottlenecks associated with adding behaviors. Perceived performance is correlated to rendering speed, or how fast the first screen of content displays.

Adding to the resource management problem is the fact that some web applications are evolving to be in an unbounded manner. For example, a typical custom home page can contain anywhere from one to many different components where the component set is potentially limitless. These pages can be very expensive in their ability to download and render. Therefore, as the set of components grow, there needs to be an infrastructure that can properly delegate and manage the deployment of necessary resources and an approach that provides the fastest response to the user.

SUMMARY

A framework for implementing web-based applications using standard object-oriented programming techniques is provided. The framework may be implemented by a script file interpreted by a browser. The framework allows a page developer to create web pages and application using a component-based pattern. The architecture extends the separation of document presentation from the document structure to include document behaviors.

In one embodiment, a computer-readable medium having computer-executable components executable by a Web browser is provided. The components include a resource creation method for creating resource objects, a page interpreter creating instances of objects based on bindings defined in a web-page, and a lifecycle management component for managing instances of the objects.

In an alternative embodiment, a method of providing a web-based application from a server to a client is provided. The method includes the steps of storing a plurality of resources on the server, providing a resource control framework interpretable by a Web-browser to a browser on a client; and providing ones of said resources to the resource control manager on the client device responsive to the browser interpreting bound resources in a document.

In another embodiment, a method of creating a web page rendered on a computer is provided. The method may include defining a call to a management framework executable by a web browser, defining at least one resource object accessible by the framework; and creating bindings to the resource object in the web page.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A method and framework for developing web applications is disclosed. The method and framework enables developers to create applications and pages by binding behaviors to page elements, behaviors and unbounded client applications can be more easily designed and result in optimized application performance.

A binding pattern is defined that associates JavaScript classes to elements on a page. Additionally, a registration process allows bindings to register for other bindings on the page, which allows a dynamic and loose association of bindings on a particular page. This method and framework enables a layered approach to resource reusability since all interactive sites can be built over the same set of core framework services. In addition additional UI paradigms and gestures can be built on top of the core services. These can be designed to be shared or can be specific to a site implementation.

The framework implements a unique component-based pattern heretofore unknown in Web-based development or highly interactive and dynamic cross-browser web sites. The framework architecture extends the separation of document presentation from the document structure to include document behaviors.

In one implementation, the framework is implemented by allowing users to build objects in a browser environment, and bind the objects to a page. The framework is implemented by one or more core files, which in one embodiment are JavaScript files, downloaded from an application server. There provide client level libraries that perform a number of functions, including object registration, destruction, and management. It is noted that the implementation of the core files as JavaScript is suitable for current Web browser as currently Web Browsers typically only understand JavaScript. However, the principles of the present invention need not be limited to JavaScript nor need each of the objects be limited to JavaScript.

Figure 1:
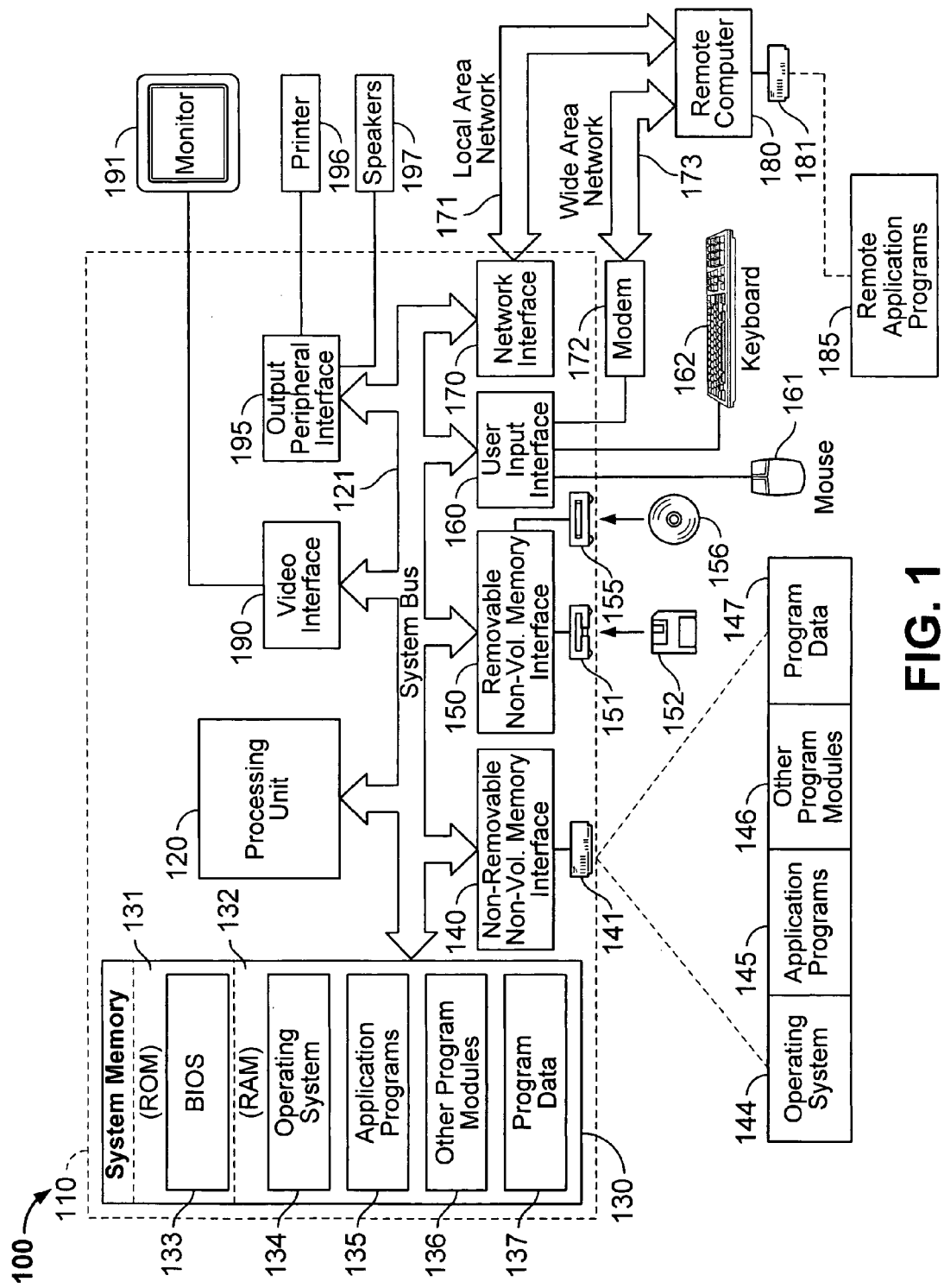
FIG. 1 depicts a processing device suitable for implementing any of the processing devices in accordance with the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
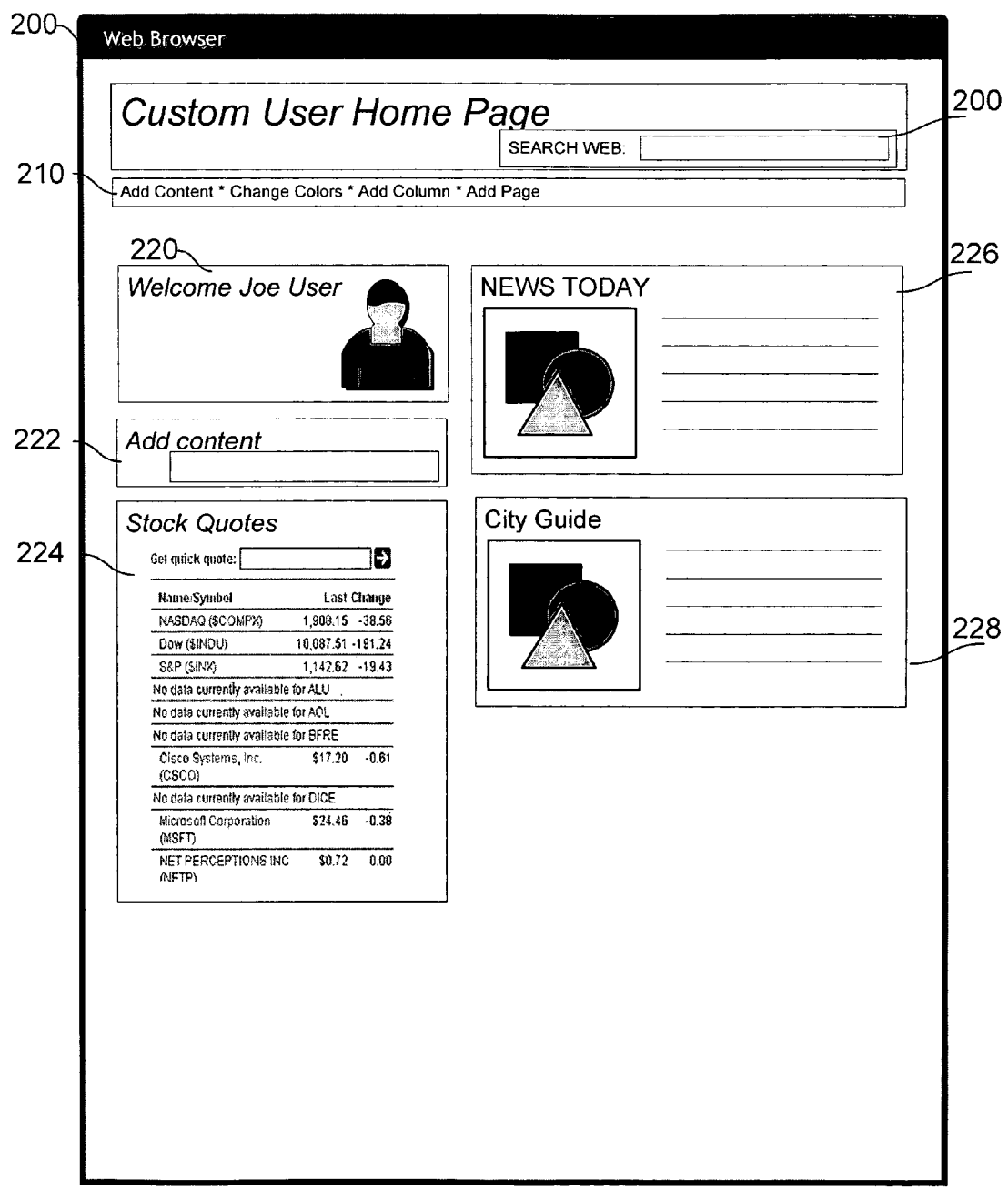
FIG. 2 depicts a multi-component web page.

FIG. 2 illustrates a web page 200 rendered in a browser and having a multiple components. The components may include a menu 210, search box 215 and modules 220, 222, 224, 226, 228. Each module 210, 215, 220, 222, 224, 228 contains content and presentation information, and may further include effects and customizable options such as in the stock list module 224. Using current development techniques, each section of the page 200 is usually enabled by content and presentation information embedded in the <BODY> of the page, or by scripts embedded in the page.

To develop page 200 using the framework, each module is defined as a JavaScript object which is then bound to the page definition and managed by the Framework. As such, the resources required by the module (or other component or element) can be managed and reused by the Framework, and developers to create documents using an object based design.

Figure 3:
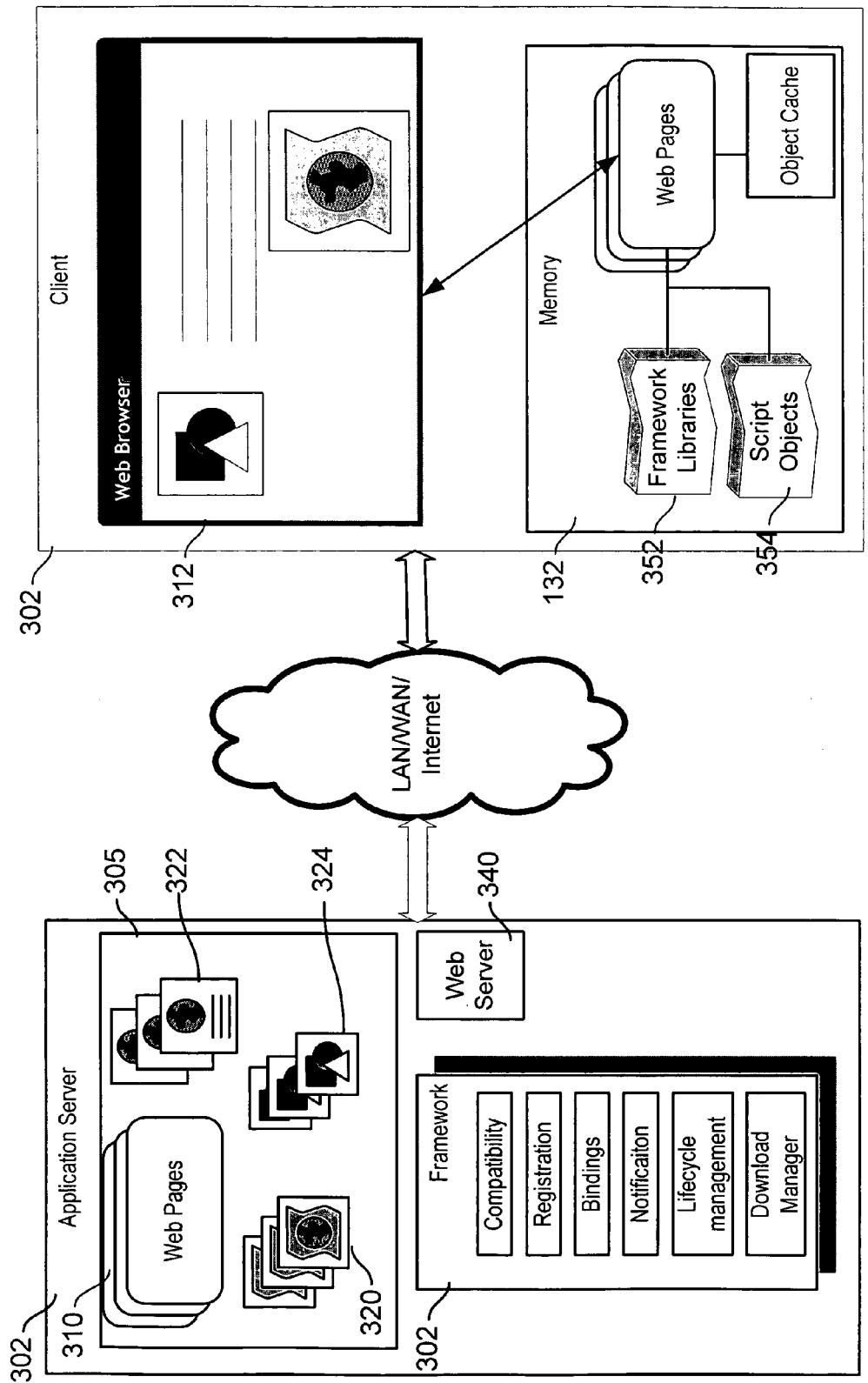
FIG. 3 depicts a server processing device and a client device suitable for implementing the framework.

FIG. 3 is a block diagram generally illustrating components of the Frameworks 330 resident on an application server 302 and a client processing device 304. Both the application server 302 and the client device 304 can be implemented by a processing device in accordance with FIG. 1. The application server 302 includes a web server process 340 managing requests from a browser application 312 on the client processing device 304. The application server 302 also includes a plurality of web pages 310 which may be provided to the client device via web server 310. Application server 302 also includes one or more framework files 330. In one embodiment, the framework is implemented by a single JavaScript file providing core functionality described herein. A core framework 330 provides a number of functions, described below, including establishing object bindings, instances of bound objects, registration, notification, lifecycle management, caching and resource downloading management. One or more additional files, (such as, "compatibility JavaScript") provide compatibility for various different browser applications. For example, a single core functionality JS file may be used for a browser application such as Internet Explorer, and a compatibility script file used for Firefox compatibility.

It will be further recognized that while the framework will be described herein as implemented with respect to JavaScript and a browser as the interpreting application, the principles of the framework are not limited thereto. The framework could be implemented in any interpreted language.

Returning to FIG. 3, application server 302 also includes script objects 320, style sheets 322, and common images 324 used in the pages 310 which may be downloaded as discussed below when any page 310 is parsed and interpreted by browser 312. The framework 330 may include a resource download controller which manages the deployment and instantiation of the scripts. The framework can load scripts asynchronously and in parallel leading to better performance on faster connections. Framework scripts, style sheets, and common images are shared across the network from a single source, thereby increasing the overall actual and perceived performance to the user. The more the user visits the application server, the faster the network runs as there is a continually increasing probability that prerequisite files are cached. The only extra downloads will be the task-specific files to the properties.

In essence, the framework enables a shared domain for hosting these shared resources. Rather than having to implement one-off scripts for shareable content, a developer is able to leverage the implementation of any individual property and inject the content into a page. This injected content uses a shared HTML semantic to ensure that it is rendered properly by each properties theme.

The client device 304 includes, for example, a web browsing application 312 which may interpret the scripting language that the framework is implemented in. Upon loading a page implementing the framework, core libraries 352 and script objects 354 used by the browser to render pages under the Framework are downloaded to the client device memory 132.

Figure 4:
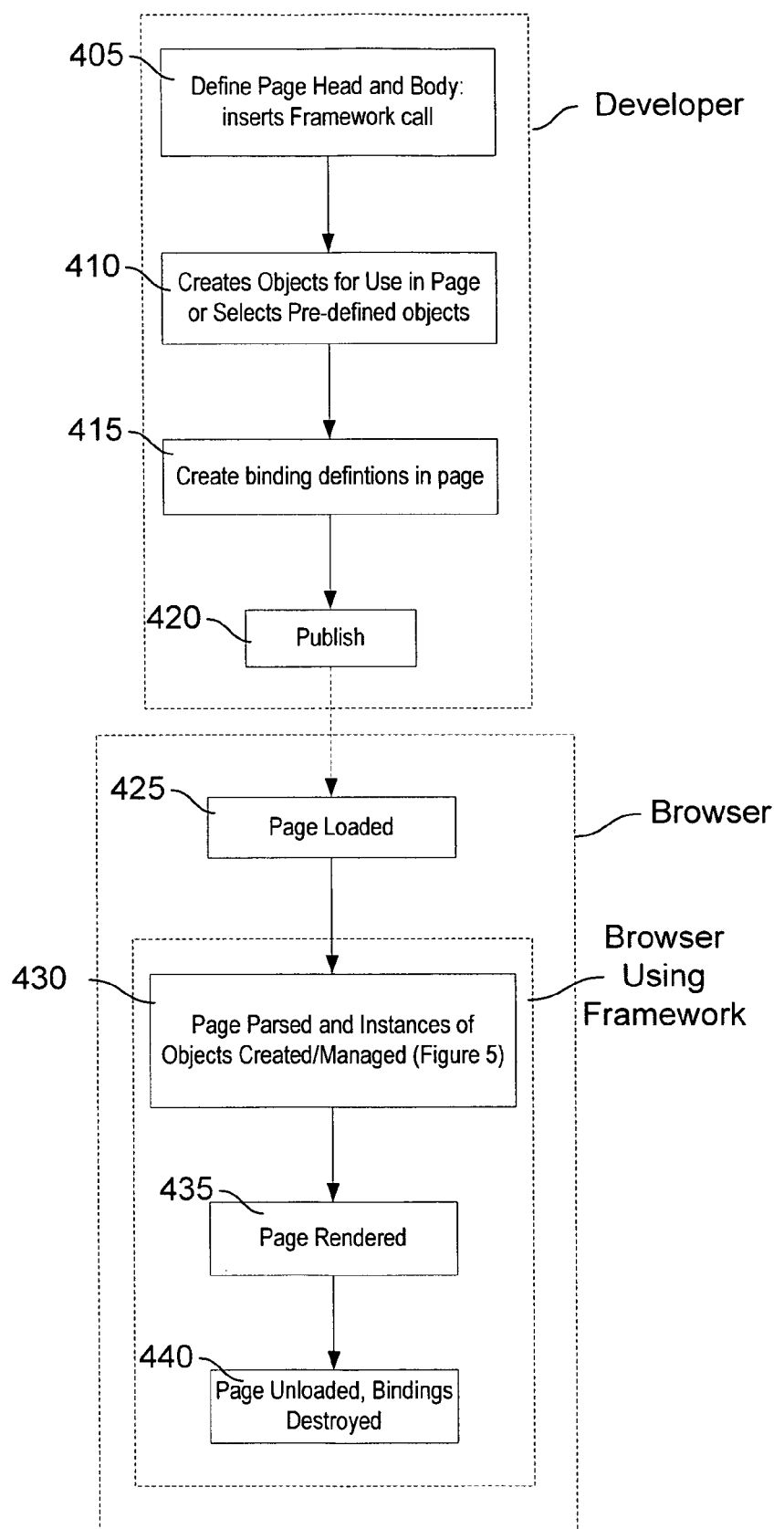
FIG. 4 is a flowchart of the process of developing and using a web application.

FIG. 4 illustrates the general process a developer will implement to create web pages and web applications using the framework of the present invention, and the steps which occur on the browser when a page is loaded. Generally, any interactive web-page consists of three components: structure, presentation, and behavior. The separation between the three components is maintained by the Framework by using the semantic "glue" of the CSS selector. In CSS, the selector specifies an association between certain elements and a specific rendering. The Framework binding mechanism extends the same philosophy to connecting behaviors to specific elements.

At step 405, the developer will define the page header and body of the web page. In this definition, the developer will install a call to the framework core file or files. As discussed below, the core library file script, and any broadly applicable library extensions, are the only scripts that need be included on a web page. All other scripts are managed and downloaded via the binding mechanisms discussed below.

As an example, the a core set of scripts (Framework Compat.JS and FrameworkCore.js) are defined in the page as follows:

```
<html xmlns:Framework>
<head>
</head>
<body>
<!--Body Contents -->
    <![if !IE]><script
    src="FrameworkCompat.js"></script><![endif]>
    <script src="FrameworkCore.js"></script>
    <script>framework.Runtime.Init( );</script>
</body>
</html>
```

In this example, the FrameworkCore.js script may be that which is used with a particular browser, such as Internal Explorer browser, while the FrameworkCompat.js file provides compatibility with other browsers.

In the numerous binding definitions set forth herein, a choice between the files may be made by including an If statement in the binding of the form:

```
<![if !IE]><script
src="FrameworkCompat.js"></script><![endif]><script
src="FrameworkCore.js"></script>
```

The XML Framework namespace should only be used by binding declarations and may be specified on the HTML element. A key tenet of the library is a prescribed JavaScript pattern for namespace scoping of client code. In JavaScript, the fact that everything is an object can be leveraged to simulate namespaces. Namespaces can span a single file or be defined across multiple files. The Framework libraries all share the Framework namespace. Only core shared functionality should be defined within this namespace. All functionality built on this library should be defined using a separate namespace.

Next, at step 410, the developer creates objects for use with the page, or selects from pre-defined objects created by others. Bindings are a cross-browser component model for attaching different behaviors to existing and custom elements.

Bindings can be declared declaratively or programmatically within the structure of a document. Bindings can be declared as a group or individually.

Initial bindings on a page are typically established using a binding element. An example framework is:

```
<Framework:binding
    selector="matching rule"
    type="binding class"
    namespace="namespace prefix">
</Framework:binding>
```

In this instance, the CSS Selector is optional. If no selector is specified, the binding is bound to the HTML element on the web-page. This is typically used by application-level bindings (explained below) that are managing the relationship and communication for other sub-bindings on the web-page. The "type" specifies the binding implementation and refers to a JavaScript class. As should be readily understood, each module may also comprise an interactive application (such as a text editor, spell checker or other web-based application) binding priority can also be specified to define a download priority any specified scripts. The default priority is high. The class allows bindings to be initialized with the class set of values.

An example of a binding is set forth below:

```
BindingNamespace.BindingType = function(p_elSource, p_objArgs,
p_objNamespace)
{
    // Establish inheritance
    BindingNamespace.BindingType.initializeBase(this,arguments);
    // Define private variables
    var p_this = this; // Expose object to scoped private
functions
    // Define private functions
    function Sample( )
    {
        // To access public members of instance, use p_this
    }
    // Define public members
    // constructor
    this.initialize = function(p_owner)
    {
        // Call base methods
        BindingNamespace.BindingType.getBaseMethod(this,"initia
lize"," Framework.Bindings.Base").call(this,p_owner);
        // Constructor processing here
    }
    // destructor
    this.dispose = function(p_blnUnload)
    {
        BindingNamespace.BindingType.getBaseMethod(this,"dispos
e"," Framework.Bindings.Base").call(this,p_blnUnload);
        // Always null object references
        p_elSource = p_this = null;
        // Detach any event handlers
```

```
    }
}
BindingNamespace.BindingType.registerClass("BindingNamespace.Bindin
gType ","Framework.Bindings.Base");
```

A binding is implemented by a JavaScript class, referred to herein as a binding implementation. As noted in the commented lines of the above example, standard object oriented design concepts of inheritance, public and private variables and functions and a constructor and destructor function are supported in a binding definition. A binding can also define its supported argument, parameter, and event list. These concepts are described and illustrated further below.

A more concrete example is the following a binding that displays "Hello World":

```
<script>
registerNamespace("Demo"); // Register the Namespace
Demo.HelloWorld = function(p_el,p_args,p_scope,p_namespace)
{
    Demo.HelloWorld.initializeBase(this,arguments);
    p_args = this.getParameters( );
    this.initialize = function(p_owner) {
        Demo.HelloWorld.getBaseMethod(this,"initialize","
    Framework.Bindings.Base").call(this,p_owner);
        p_el.innerHTML = "Hello World";
    }
    this.dispose = function(p_blnUnload)
    {
        Demo.HelloWorld.getBaseMethod(this,"dispose","
    Framework.Bindings.Base").call(this,p_blnUnload);
        p_el = null;
    }
}
Demo.HelloWorld.registerClass("Demo.HelloWorld","Framework.Bindings
.Base");
    <script>Framework.Runtime.init( );</script>
```

In one embodiment, all bindings inherit from a base class, Frameworks.Bindings.Base. Inheritance is implemented by specifying class inheritance on the type of the derived class (Demo.HelloWorld.registerClass("Demo.HelloWorld", "Framework.Bindings. Base")). Next, the first line of the class calls an initializeBase method. This call instantiates and propagates the base classes methods onto the current instance.

Bindings, once defined, can then be associated to elements on the page by the developer. At step 415, the developer inserts bindings in the body of the page. Each declared binding can create an instance of the object bound, as discussed below. The binding class can be associated with 0 to many elements on a web page. Each association creates an instance of the binding implementation. As discussed below, associations can be created either declaratively or programmatically.

Example 3 illustrates how a developer at step 415 creates and associate element(s) with the HelloWorld class. In this example, all DIV elements are bound with the class name "hello" to the HelloWorld binding implementation:

```
<html xmlns:Framework>
<head>
<title>Hello World</title>
```

```
</head>
<body>
<p>A couple of instances of the binding:</p>
<div class="Hello"></div>
<div class="Hello"></div>
<div class="Hello"></div>
<Framework:binding selector="div.hello"
```

```
type="Demo.HelloWorld"></Framework:binding>
<script>Framework.Runtime.init( );</script>
</body>
</html>
```

Figure 6:
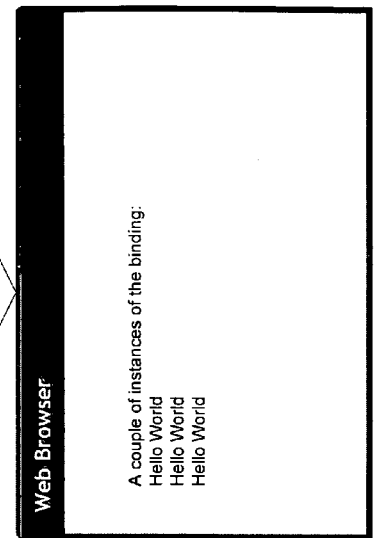
FIG. 6 is a depiction of how a binding class and HTML page defining a binding instance are displayed in a browser.

The above file sample displays Hello World three times. This is illustrated in FIG. 6.

The binding resources define the binding implementation. A binding implementation can consist of zero (0) to many scripts and zero (0) to many style sheets. If no script external resource is specified, it must be included directly within the web-page. The binding resources are created using a binding "References" tag.

For example, a weather binding set forth below might require two resources:

```
<Framework:binding selector=".test" type="Start.WeatherModule">
    <Framework:References priority="High">
        <Framework:add
            src="custom/weather.js"
            type="script">
        </Framework:add>
```

```
        <Framework:add
            src="custom/weather.css"
            type="css">
        </Framework:add>
    </Framework: References >
</Framework:binding>
```

In one embodiment, the framework is optimized to manage and properly download each resource only once. A binding will not be instantiated until all the specified resources have been deployed. Since scripts are downloading after the page loads, scripts should not include any inline execution that depends on another file (e.g., call a function in another file while the script is parsed) or writes any contents into the page.

The framework causes the browser to avoid executing any script until after the initial parsing of the page. To ensure this pattern is followed, the framework binding object scripts should be included immediately prior to the page's closing HTML element. In addition, the last script on the page (Framework.Runtime.init( )) calls the initialization of the library.

Once the bindings are declared in the page, the page can be published and available for distribution at step 420.

Figure 5:
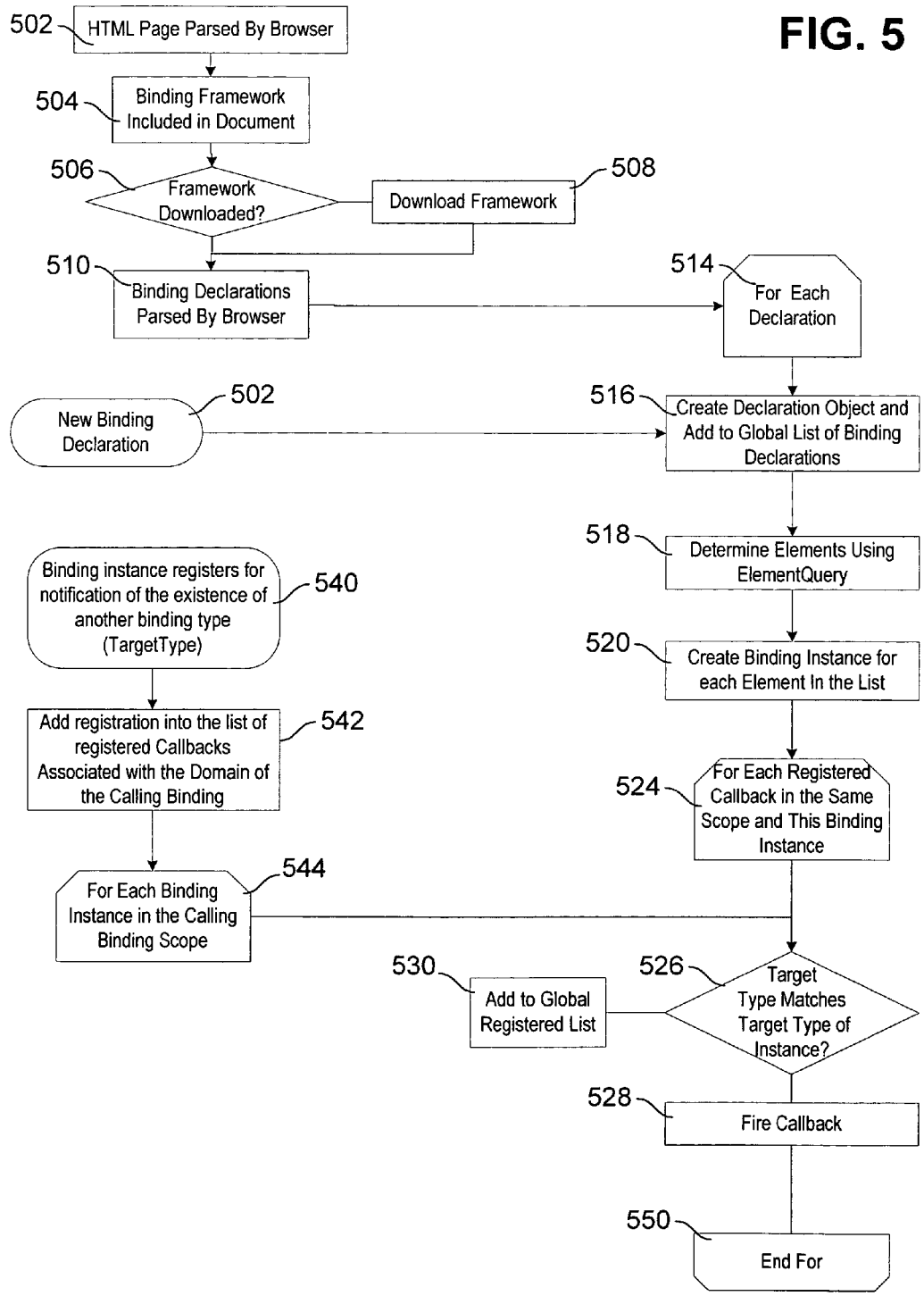
FIG. 5 is a flowchart of the registration process of the present invention.

At a later point in time, when a user requests the page, the page is loaded at step 425. In the Browser, the page is parsed 430 and a binding instance is created for each element in the listed binding declarations. Step 430 is further detailed in FIG. 5. The page is then rendered at step 435. When the page is unloaded (or navigated away from) instantiated binding's dispose method is called notifying the binding to destroy and clean-up its references.

Before discussing the operation of the browser on a page designed to operate using the framework, specific features of the bindings and methods supported by the framework will be described.

As noted above, bindings can have their class and instance level defaults defined declaratively. All default values specified declaratively are string-based values. The same binding type may be used with different definitions and parameters by creating different variations of the same binding declarations.

Class-level default parameters are specified using a tag; in the below example, the tag is "Framework:defaults". Class-level definitions include the default parameters for all created instances of the binding definition. In the following example, different variations of the binding "editor control" are bound to different selectors:

```
// First selector binding
<Framework:binding selector=".EditArea"
    type="Framework.UI.Editor.Control" namespace="edit">
    <Framework:references priority="immediate">
        <Framework:add src="FRAMEWORKEdit.js"
            type="script"></Framework:add>
        <Framework:add src="FRAMEWORKUI.js"
            type="script"></Framework:add>
        <Framework:add src="FRAMEWORKEditStrings.js"
            type="script"></Framework:add>
    </Framework:references>
    <Framework:defaults>
        <Framework:param name="commands"
            value="TextFormat,Color,Customize">
        </Framework:param>
        <Framework:param name="toolbar"
            value="shared">
        </Framework:param>
    </Framework:defaults>
```

```
</Framework:binding>
// Second selector binding
<Framework:binding selector=".HTMLArea"
    type="Framework.UI.Editor.Control"
        namespace="edit">
        <Framework:references priority="immediate">
            <Framework:add src="FRAMEWORKEdit.js"
                type="script"></Framework:add>
            <Framework:add src="FRAMEWORKUI.js"
                type="script"></Framework:add>
            <Framework:add src="FRAMEWORKEditStrings.js"
                type="script"></Framework:add>
        </Framework:references>
        <Framework:defaults>
            <Framework:param name="box"
                value="iframe">
            </Framework:param>
        </Framework:defaults>
</Framework:binding>
```

In addition to class-level parameters, instance-specific defaults may be specified at the element level. These defaults will override any parameters specified at the class level. Specifying instance-level defaults requires first defining the namespace used for instance-level defaults on the binding declaration using the namespace attribute on the Framework:binding tag. In addition, the namespace is then used as a prefix for all attributes on the element being bound. This eliminates ambiguity in binding-specific properties.

All parameters specifiable by an instance must be defined on the binding class as a Params property. For example:

```
Framework.UI.Editor.Control = function(p__elSource,p__objArgs)
{
    Framework.UI.Editor.Control.intializeBase(this);
    p__objArgs = this.getParameters( ); // Merge class and instance
    alert(p__objArgs.box)     //Display the value of the box
argument
}
Framework.UI.Editor.Control.Params =
Framework.Enum.create("toolbar","command","width","height");
```

Also as noted above, the framework also provides encapsulation and scoping. JavaScript closures provide encapsulation of a binding implementation as illustrated in the example below. The below example creates a ticking clock binding which can be instantiated to display any number of ticking clocks on a web-page:

```
<script>
registerNamespace("Demo"); // Register the Namespace
Demo.Clock = function(el) //
{
    var timer;
    Demo.Clock.initializeBase(this,arguments);
    function UpdateTime( )
    {
        el.innerHTML = new Date( );
    }
    this.dispose= function(p__blnUnload)
    {
        Demo.Clock.getBaseMethod(this,"dispose","Web.Bindings.Base").
call(this,p__blnUnload)
        clearInterval(timer); // Binding is being destroyed
        el = null; // Always null the bound element
    }
    this.initialize = function (p__owner)
    {
```

-continued

```
        UpdateTime( );
        Demo.Clock.getBaseMethod(this,"initialize","Web.Bindings.Base
").call(this,p__owner)
            // Use the timer utility (we use a single timer pool)
            timer = setInterval(UpdateTime,900);
        }
}
Demo.Clock.registerClass("Demo.Clock","Web.Bindings.Base");
<script>Framework.Runtime.init( );</script>
```

The Bindings instances are created in the following example, which also illustrates styling using CSS:

```
<html xmlns:Framework>
<head>
    <title>Ticking Clock</title>
    <style>
        /* Style the clocks */
        .Demo__Clock{font-size:14pt}
        .Demo__Clock.red {color:red}
    </style>
</head>
<body>
<p>A couple of instances of the binding:</p>
    <div class="clock red"></div>
    <div class="clock"></div>
    <div class="clock"></div>
    <Framework:binding selector="div.clock" type="Demo.Clock">
    </Framework:binding>
</body>
</html>
```

The variables in the above example have a scope since each instance of the binding is a new instance of the binding implementation; there is a separate lexical scope for each instance. Each execution of the timer runs the "UpdateTime" function in the lexical scope of the object instance. Therefore, the defined variables are scoped and available for use. The destroy function is called when the binding is removed from an element. In this example, this occurs when the page is unloaded. Lastly, each clock can have a style declaration associated with it.

The default arguments are passed into the binding constructor as the second argument. This argument is an associative array of values. If a default value is not specified for a property it will return null. It can also be determined if a different default class-level value was specified. This is accomplished by looking at the default property of the attribute. If this property is not null, a default class-level value was specified that was overridden by the instance.

Bindings can expose events and broadcast messages. Bindings can also attach to other bindings events or register for message broadcast. The difference between a binding event and a broadcast is a binding event is associated with a specific binding instance. Therefore, to receive the event must be explicitly attached to the binding instance. On the other hand, a message broadcast is not associated with a specific instance and can be listened for without regard to the binding source.

Bindings can expose events, methods and properties. All events supported by a binding must be defined on the binding class. This is accomplished via a special enumeration: "Events." For example:

```
Demo.binding = function(el)
{
```

-continued

```
}
Demo.binding.Events =
Framework.Enum.Token.create("onclick","onkeypress");
```

To expose events on a binding, one creates an Events enumeration on the class. This enumeration specifies all public events. To fire an event, for binding calls a "fire" method. This method takes two arguments, the event name and an object representing any payload carried with the event fire ("eventName",data). The event object is the first argument past to all event handlers. The event object has at least three properties: srcBinding, eventName, and Package. The Package represents the data past by the event initiator.

To assist in defining properly scoped style definitions to a binding, bindings automatically or manually apply a class structure consistent with a binding type to the bound element. In a binding intiialize( ) constructor, one can call a "this.ApplyClass( )" method. This method will append javascript types (including any derived from) to the bound element's class attribute. For example, if one were to bind a class Start.WeatherModule to the DIV element <div class= "root"> . . . </div>, after calling this.ApplyClass( ) the class name on this element will be extended to: <div class="root Start_WeatherModule Framework_Bindings_Base"> . . . </div>. All javascript types will be appended with the "." characters converted to "_" on the class attribute of the element. Now one can easily create properly scoped styles as follows:

.Start_WeatherModule DIV {position: absolute; top:10px; left:10px}

The DIV tags within the binding will be absolutely positioned at the specified position. If the binding is detached from the element, the class names (if generated automatically or using the ApplyClass method) will be automatically removed from the element.

As an example of how a binding can expose events, methods, and properties, a "list" binding is set for the below. This example illustrates how Framework allows different bindings to communicate with each other:

```
<script>
registerNamespace("Demo"); // Register the Namespace
Demo.List = function(el) //
{
    Demo.List.initializeBase(this,arguments);
    var list = new Array( );
    this.dispose = function(p__blnUnload)
    {
    Demo.List.getBaseMethod(this,"dispose","Web.Bindings.Base").c
all(this,p__blnUnload);
        while (list.length>0)
            list.pop( ).detachEvent("ondblclick",DoRemove);
    }
    function DoRemove(ev)
    {
        ev.srcBinding.detachEvent("ondblclick",DoRemove);
        list.remove(ev.srcBinding);
        ev.srcBinding.RemoveItem( );
    }
    this.initialize = function(owner)
    {
        Demo.List.getBaseMethod(this,"initialize","Web.Bindings.Base"
).call(this,owner)
            list =
Web.Bindings.attachSelectorBindingSync(".listItem",Demo.ListItem,th
is,null,null,el);
            for (var i=0;i<list.length;i++)
```

-continued

```
        list[i].attachEvent("ondblclick",DoRemove);
    }
}
Demo.List.registerClass("Demo.List","Web.Bindings.Base");
Demo.ListItem = function(el)
{
    Demo.ListItem.initializeBase(this,arguments);
    var obj = this;
    el.attachEvent("ondblclick",ondblclick)
    function ondblclick( )
    {
        obj.fire("ondblclick",obj);
    }
    this.RemoveItem = function( )
    {
        el.detachEvent("ondblclick",ondblclick);
        Web.Bindings.removeBindings(el);
        el.removeNode(true);
    }
    this.initialize = function(owner)
    {
        Demo.ListItem.getBaseMethod(this,"initialize","Web.Bindings.Base").call(this,owner);
    }
    this.dispose = function(p_blnUnload)
    {
        Demo.ListItem.getBaseMethod(this,"dispose","Web.Bindings.Base").call(this,p_blnUnload);
        el.detachEvent("ondblclick",ondblclick);
    }
    return this;
}
Demo.ListItem.registerClass("Demo.ListItem","Web.Bindings.Base");
Demo.ListItem.Events = Web.Enum.create("ondblclick");
</script>
```

The binding instances are created by the following HTML:

```
<html xmlns:Framework>
<head>
<title>List Semantics</title>
</head>
<body>
<p>A couple of instances of the binding:</p>
<ol class="list">
<li class="listItem">Test</li>
<li class="listItem">Test 2</li>
<li class="listItem">Test 3</li>
<li class="listItem">Test 4</li>
<li class="listItem">Test 5</li>
</ol>
<table class="list">
<tr class="listitem"><td>col 1a</td><td>col 1b</td></tr>
<tr class="listitem"><td>col 2a</td><td>col 2b</td></tr>
<tr class="listitem"><td>col 3a</td><td>col 3b</td></tr>
</table>
<Framework:binding selector=".list"
type="Demo.List"></Framework:binding>
<script>Framework.Runtime.init( );</script></body>
</html>
```

In this example, the semantics of a ListItem are separated from the List class. This separation allows the ListItem to be treated as an independent type. Each list item has behavior semantics separate from the underlying HTML structure. The binding is applied two differently shaped sections of HTML.

Most of the time, bindings are created asynchronously. To simplify wiring of sub-bindings where external script sources are not specified, the attachElementBindingSync and attachSelectorBindingSync methods are provided in the Framework 6 return the binding or array of bindings respectively. If a callback (discussed below) is also specified, it will get called.

Bindings can also be established from within scripts. This is most often done to create bindings scoped within another binding (as in the list example set forth above). The arguments used to establish a binding programmatically are similar to the attributes used by the link element.

Bindings can be attached via a CSS Selector, and the Framework may provide an Application Programming Interface (API) to allow attaching the binding using a selector in a manner similar to using a link element. For example:

```
arrBindings    = Framework.Bindings.AttachSelectorBinding(
                 p_vSelector,
                 p_vBindingType,
                 p_objScope,
                 p_htParams,
                 p_strNamespace,
                 p_elRoot,
                 p_fncCallback,
                 p_astrBindingSource,
                 p_astrStyleSource,
         p_ePriority)
```

The bindingType can be specified as either a string value or an actual javascript class. Generally, one defines the binding type as a string unless it is known that the binding type already exists. Optional binding resources such as style sheets and scripts are supplied as an array.

Bindings attached programmatically via a selector can specify a root element (p_elRoot) to apply the selector against. The selector is then validated against the sub-tree below the specified root element. If a root element is not specified, the entire document is scanned for matching elements. A selector method returns an array of bindings when no external sources are specified. If any external script sources are specified, the return value is an empty array and a reference to the attached bindings may be obtained via a callback (the binding is instantiated asynchronously). In all cases, if a callback is specified, it will be called when the binding is created.

The Framework supports encapsulation and the binding scope is useful when creating a hierarchy of bindings. All bindings have a scope—whether the global scope or encapsulated within another binding. Scope is useful when creating a hierarchy of bindings. If scope is not specified, the binding is registered in the global scope. Scoping enables an object hierarchy of bindings to be established and defines the bindings visibility for registrations (see below).

In one case, one can attach a binding directly to an element. An element can be anything in the page definition Directly attaching a binding takes a single element to which the binding is attached and an optional scope. The rest of the arguments work the same as the AttachSelectorBinding method previously described.

As noted above, FIG. 5 illustrates step 430 in FIG. 4, the process of page loading and rendering. Initially, at step 502, a web page is parsed by a browser. As noted above, to implement the binding framework, the binding framework reference is included in the document 504. At step 506, the browser will determine whether the Framework libraries have been already downloaded and if not, will download the Framework core files at 508. This may include downloading one or more core functionality files and one or more compatibility files, as discussed herein.

Next, at step 510, the binding declarations listed in the document will be parsed by the browser. A first FOR loop at 514 begins such that for each declaration in the page, an binding declaration object is created at step 516 and the object is added to a global list of binding declarations maintained by the framework. Next at step 516, the elements for the declaration are determined using the declaration's ElementQuery.

Next, a binding instance is created at 520 for each element in the list. Steps 516, 518 and 520 are also performed for any new binding declaration defined.

Bindings are automatically established when the framework is initialized. While not precluded, there is no automatic revalidation if the document structure changes. If an element is added, removed, or changed, and bindings need to reflect such changes, one will typically manually revalidate the elements. There are a number of methods available for this process. A Bindings.revalidateBinding( ) method will review all existing bindings specified with a CSS selector within a scope and validate that the selector still applies to the element. Note that any bindings attached directly to the element (not using a CSS selector) are not removed. A Bindings.extendBinding( ) method reviews all selector based bindings and adds any new bindings that match the element within the specified scope. A Framework.Bindings.removeBindings( ) method removes all bindings attached to an element. This method may be called before deleting a node from the document tree that may contain a binding. This ensures that any references are properly cleaned up.

Sub-bindings are created as children of an existing binding using the aforementioned scope. This is done by directly calling an Attach*Binding methods. However, if access to another binding on the web-page is required, it may be requested via the registration mechanism.

Registration is the process of requesting a notification when an instance of a specific or any binding type is created. Two methods are provided for registering for bindings—one for bindings within the current page and another for registering for bindings that exist in another window. The registerFor method is for requesting access to each instance of other binding types that may exist on a page. The class name is specified as a string and its definition does not need to exist at the time of the call. Once a binding instance of the specified type is created, a notification will be provided via an "onregister" notification or the optional specified callback (Step 528 below). An optional argument, p_elRoot, specifies whether to only look for bindings that are a descendant element of a specific element or to look for the binding instance anywhere within your scope.

A registerForInWindow method enables cross-window accessing of bindings. This method is similar to the registerFor method, but allows one to specify a window object that specifies the window used to look for the binding instances.

You can register for all bindings within a scope by specifying as the binding type. In addition, when you register for a binding's class, you are notified for all binding instances that match that class and any binding instances that derive from that class. Therefore, registering for "Framework.Bindings.Base" is analogous to registering for "*" since all bindings are derived from that base class.

When a binding matches the registration, your specified callback is executed. The callback received two arguments. For example:

```
this.RegisterFor("*", GotMatch)
function GotMatch(p_objBinding,p_blnState)
{
    // p_objBinding is the matched binding
    // p_blnState is true when the binding is created, false when the binding is being removed
}
```

All bindings are associated with a specific element. An onbinding or onunbinding event occurs if another binding is attached or removed from your bound element. This event receives a reference to the newly instantiated binding.

Returning to FIG. 5, a second FOR loop occurs for registered callbacks and notifications. At step 524, for each registered callback in the same scope as the binding instance, determination of whether the target type matched the type of the new instance is made at step 526. If so, a callback is fired at 528. If not, the callback is registered to the global callback list at 530. Note that when a new binding instance may register for notification of the existence of another binding type at 540. When this occurs, the registration is added into the list of registered call backs at step 542, and at step 544, for each binding instance in the calling binding scope, steps 536, 528 and 530 are performed.

A dispose is provided so that developers can remove references to other objects, bindings, or events. One must make such dereferences so not to receive events or other notifications when their binding is no longer active.

Dispose is called when a binding is detached from an element or the page unloads. The Boolean argument is true when the binding is being destroyed because the page is unloading. In this event, you should remove any synched events and clear any object references you may have made. Failure to do so can cause random results.

The framework also supports Application level bindings. An Application level binding is a non-UI binding that is used to manage the interactions on a web-page. An application binding is defined by not specifying any selector. Since all bindings ultimately are associated with an element, application level bindings are attached to the HTML element.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-readable storage device having computer-executable components executable by a processing device to perform a method, the processing device accessing a local memory, comprising:
    (a) receiving a web-page including elements defined to access a plurality of resources in a JavaScript framework provided to the processing device in local memory, the resources including methods interpreted by a browser to create resource objects;
    (b) parsing the web-page to define instances of objects based on bindings to the resources defined by elements in the web-page;
    (c) downloading a base set of resources in a core framework library of the JavaScript framework to the local memory;
    (d) determining if additional resources not included in the local memory are needed based on the bindings declared in the web-page and if so, downloading the additional resources to a resource cache in local memory;
    (e) managing instances of the objects by maintaining a global list of binding declarations maintained by the JavaScript framework; and
    (f) displaying the web-page in the browser using one or more of the objects.

2. The computer-readable storage device of claim 1 managing instances of said objects includes managing instances of objects in a first web-page window and a second web-page window within the JavaScript framework.

3. The computer-readable storage device of claim 1 wherein the objects include a type.

4. The computer readable storage device of claim 1 wherein the objects include a scope.

5. The computer readable storage device of claim 1 wherein the objects may be inherited.

6. The computer-readable storage device of claim 1 wherein the JavaScript framework includes a first core framework library compatible with a first web browser type and a second core framework library file compatible with one or more second web-browser types.

7. The computer-readable storage device of claim 1 wherein each element may have from 0-n bindings.

8. The computer-readable storage device of claim 1 wherein the resource is defined as a script or style.

9. The computer-readable storage device of claim 1 wherein the JavaScript framework includes a namespace for instance arguments.

10. The computer-readable storage device of claim 1 further including destroying the bindings on unloading of the web-page.

11. The computer-readable storage device of claim 1 wherein the step of constructing bindings after all resources bindings in the web-page are determined.

12. A method of providing a web-based application from a server to a client, comprising:
    retrieving a web-page, the web-page including at least a structure component, a rendering component and one or more behavior bindings;
    retrieving a plurality of base resources comprising a JavaScript resource framework in at least one framework file called in the web-page and interpretable by a Web-browser, the base resources including methods interpreted by a browser to create resource objects;
    parsing the web-page to create instances of objects based on bindings to the base resources defined by elements in the web-page;
    determining if additional resources not provided in the at least one framework file is required and if so, downloading the additional resources to a local memory cache;
    registering one or more binding instances by type with a global list of binding instances;
    receiving a notification when a second instance of a type of a binding instance is created;
    constructing binding instances for the web-page after all binding instances having been determined; and
    displaying the web-page using one or more instances of the objects.

13. The method of claim 12 wherein the step of retrieving includes retrieving user-defined resources comprised of at least one script.

14. The method of claim 12 wherein the step of retrieving a resource control framework comprises providing one or more script files.

15. A method of creating a web-page rendered on a computing device, comprising:
    storing plurality of resources comprising a JavaScript framework in a first base resource file compatible with a first type of web browser and a second base resource file compatible with at least one second type of web browser;
    defining at least one resource object accessible by the JavaScript framework in the web-page;
    responsive to a call for the web-page, providing the web-page to a browser application;
    responsive to a call for the JavaScript framework, providing at least the first base resource file or the second base resource file to a web browser;
    wherein the web-page includes one or more declarations of bindings which define instances of objects based on the resources in the first base resource file or the second base resource file defined by elements in the web-page, and the web browser parses the web-page to determine all bindings defined the web-page to ascertain whether if additional resources not provided in the at least the first base resource file or the second base resource file required to render the web-page and if so,
    receiving a request for the additional resources and providing the additional resources responsive to the request; and
    wherein the web browser prevents constructing binding instances for the web-page until all binding instances having been determined and all resources provided after which the web-page may be displayed using one or more instances of the objects.

16. The method of claim 15 wherein the step of defining at least one resource object includes defining an object class including a behavior.

17. The method of claim 16 wherein the step of defining an object class includes defining an inheritance for the object.

18. The method of claim 15 wherein the step of defining at least one binding includes binding the resource object to an element in the web-page.

* * * * *